Aug. 3, 1943.   C. W. GILDEA ET AL   2,325,848
TIRE CARRIER
Filed June 6, 1941   2 Sheets-Sheet 1

Inventors
Joseph A. Hausmann and
Charles W. Gildea
By Paul O. Pippel
Atty.

Aug. 3, 1943.  C. W. GILDEA ET AL  2,325,848
TIRE CARRIER
Filed June 6, 1941  2 Sheets-Sheet 2
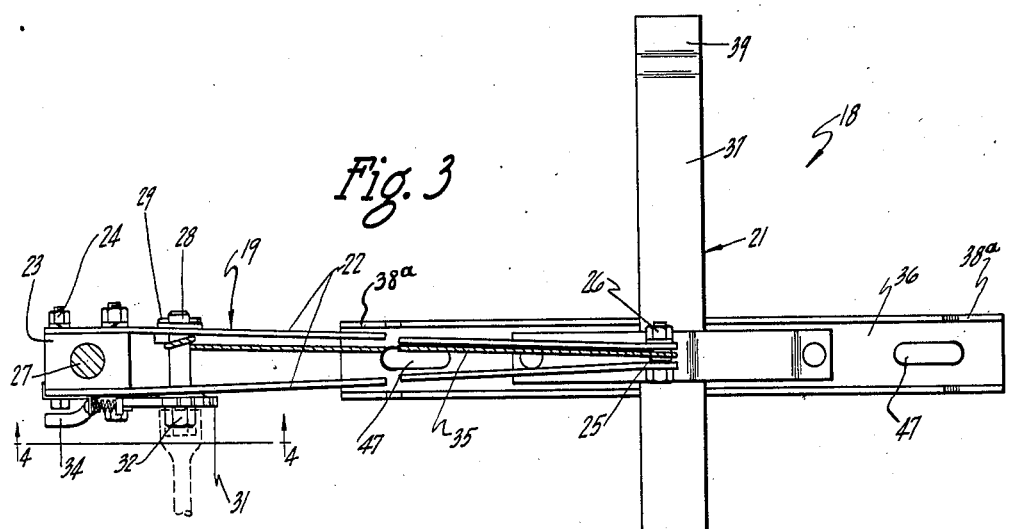
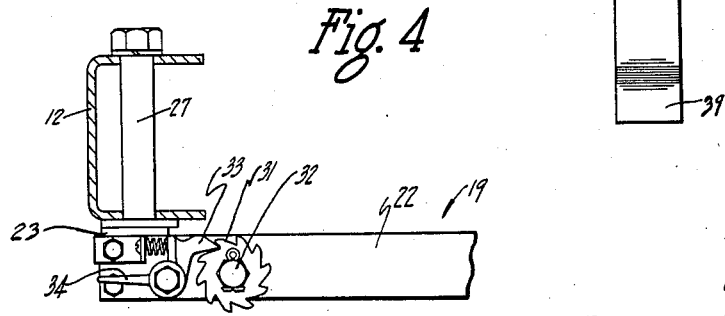
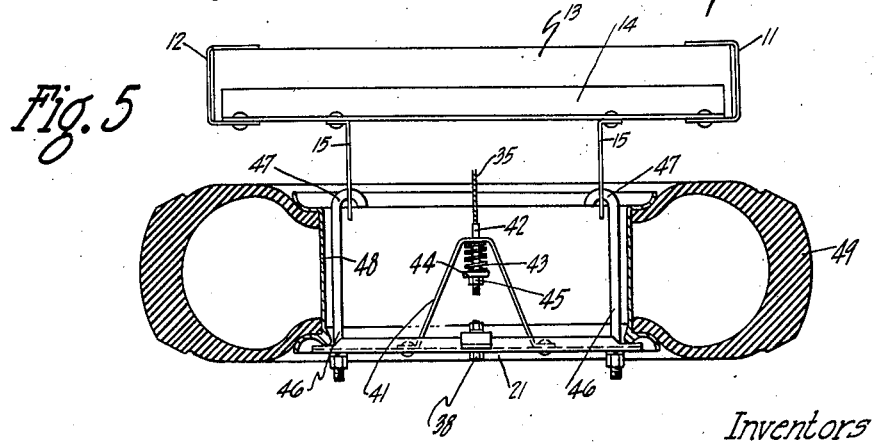
Inventors
Joseph A. Hausmann and
Charles W. Gildea
By Paul O. Pippel
Att'y.

Patented Aug. 3, 1943

2,325,848

UNITED STATES PATENT OFFICE 2,325,848

TIRE CARRIER

Charles W. Gildea and Joseph A. Hausmann, Fort Wayne, Ind., assignors to International Harvester Company, a corporation of New Jersey Application June 6, 1941, Serial No. 396,908

2 Claims. (Cl. 224—29)

This invention relates to a spare tire and rim carrier, and more particularly to the type of carrier that is adapted to carry a tire and rim under the chassis frame of an automotive vehicle.

Heretofore, tire and rim carriers for automotive vehicles have been of the type wherein the tire had to be pushed on the ground underneath the frame of the vehicle. When the tire and rim was in this position, an elevating means was provided for lifting the tire into engagement with the frame, in which position it was secured to the frame. This type of tire carrier is not satisfactory for use with modern trucks, since the tires are large and heavy. Consequently, it takes a great deal of effort on the part of the operator to mount and remove the tire from its carrier.

With these objectionable features in mind, it is an important object of the present invention to provide a tire carrier for an automotive vehicle in which the tire may be quickly and easily moved to its position on the chassis frame in which it is to be carried.

Another object of the present invention is to provide a tire carrier which is simple and economical to manufacture, and which may be readily mounted on any automotive vehicle chassis.

Another object of the invention is to provide a novel means for securing the tire and wheel in juxtaposition to the chassis.

According to the present invention, the tire carrier comprises a member which is pivotally mounted on the chassis frame in such a manner that it may swing toward or away from the chassis frame in a horizontal plane. An elevating means is associated with the member and consists of a ratchet mechanism and a support which are connected by a flexible cable. When it is desired to mount a tire and rim on an automotive vehicle, the member is moved to the rear or to the side of the chassis frame. The support is inserted under the rim of the tire, and the ratchet mechanism is then operated so as to lift the tire off the ground. The member is then swung under the chassis frame, and the tire is raised into engagement with the chassis. When the tire is in its raised position, means are provided for securing the support to the frame for holding the tire in its raised position.

By virtue of these particular features, a novel tire carrier is provided for a truck or the like, which permits the quick removal and mounting of the spare tire and rim.

These and other objects and advantages of the present invention will be apparent to those skilled in the art after a careful consideration of the following detailed description of the preferred structural embodiment, taken in conjunction with the accompanying drawings.

In the drawings:

Figure 3 is an enlarged plan view of the supporting member and elevating means;

Figure 4 is a sectional view taken along the line 4—4 of Figure 3; and,

Figure 5 is a sectional view taken along the line 5—5 of Figure 1.

Figure 1:
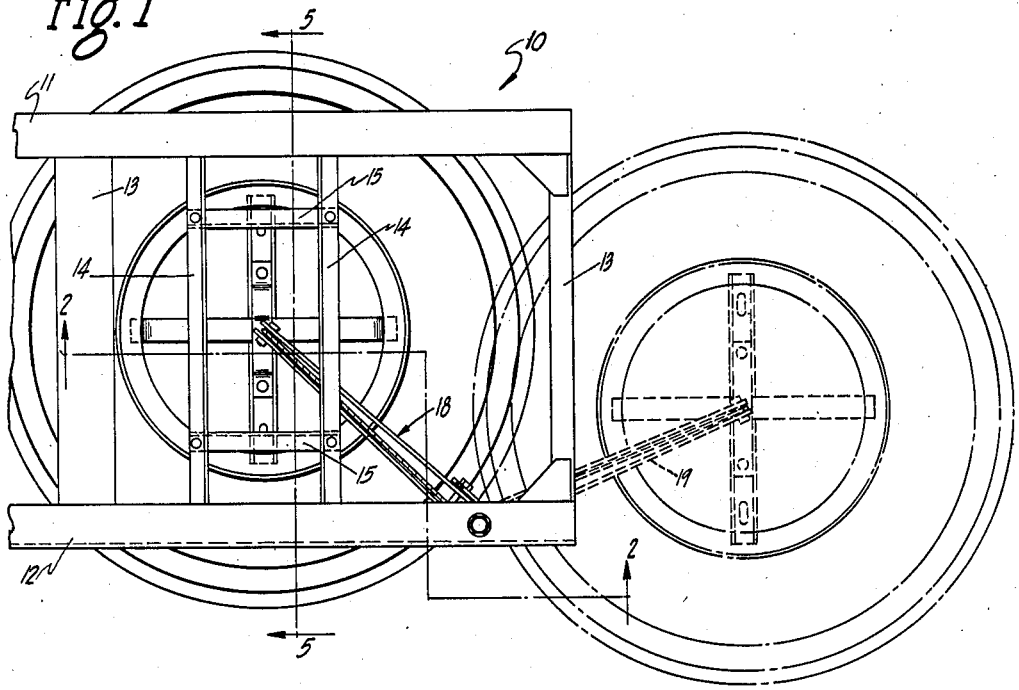
Figure 1 is a plan view of a truck chassis on which is mounted the novel tire and rim carrier.
Figure 2:
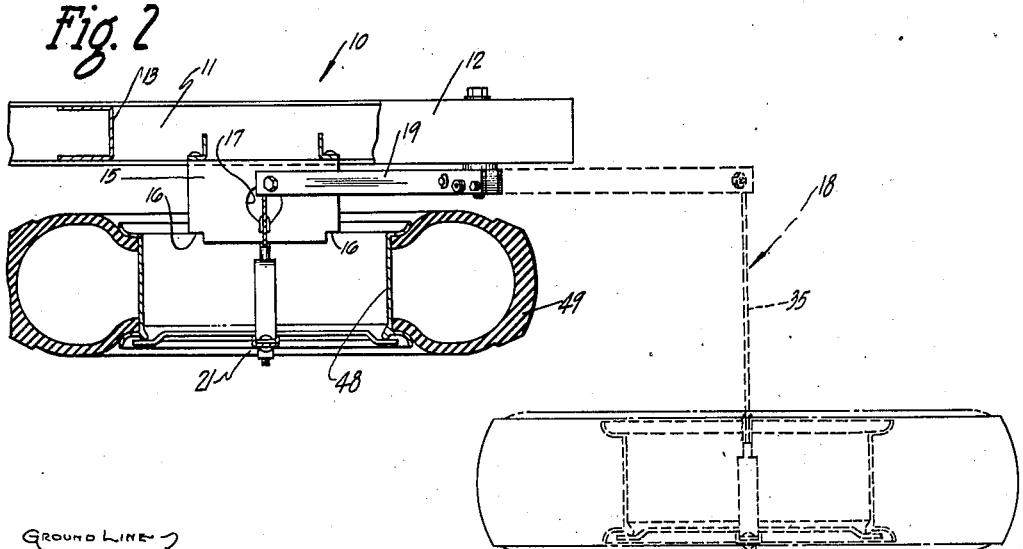
Figure 2 is a sectional view taken along the line 2—2 of Figure 1 and shows the tire mounted on the support and also shows the tire in its elevated position proximate the chassis frame.

Referring now to the drawings, and more particularly to Figures 1 and 2, it will be seen that the numeral 10 denotes a truck chassis frame which consists of longitudinal side frame members 11 and 12 between which are secured transverse frame members 13. There are also provided between the side frame members 11 and 12 transversely spaced angle members 14, between which are secured plates 15. Each of the plates 15 extends downwardly and is provided with notched portions 16 and an opening 17.

The elevating means is referred to in its entirety by the numeral 18 and comprises a member 19 and a support 21. The member 19 consists of two bars 22, the ends of which are secured to a part 23 by a pair of bolts 24. The bars 22 extend outwardly from the part 23 and a roller 25 is secured between the outwardly extending ends by means of a bolt 26. Referring to Figure 4, it is to be noted that the part 23 is adapted to be journaled on a vertical pivot pin 27, which is carried by the side frame member 12. As shown in Figure 1, when the member 19 is mounted on the frame bar 12, the member may move in a horizontal plane toward or away from the chassis frame 10. Between the bars 22 and near the pivot pin 27 is journaled a shaft 28 which extends beyond the bars 22, and is held in position on the bars 22 by a cotter pin 29 at one end and a ratchet 31 provided at the other end. The ratchet 31 is held on the shaft 28 by a nut 32, which is threaded on the end of the shaft 28. A latch 33 is mounted on one of the bolts 24 and is adapted to cooperate with the ratchet 31. A lever 34 extends from the latch 33 so that the latch may be moved manually out of engagement with the ratchet 31. A cable 35 is secured to the shaft 28 and extends outwardly over the roller 25 provided at the ends of the bars 22, and is connected to the support 21.

The support 21 comprises a channel member 36 and a bar 37, which are secured at their midpoints by a bolt 38. The channel 36 is arranged at substantially a right angle to the bar 37. The outer ends of the channel 36 and the bar 37 are provided with recesses 38a and a downwardly extending portion 39, respectively, which are adapted to fit the rim of the tire. On the channel member 36 is mounted an inverted U-shaped bracket 41 with which the cable 35 is connected. This connection is made by a threaded bolt 42 which is provided at the end of the cable 35. The bolt 42 is inserted in an opening provided in the U-shaped bracket 41. A spring 43 and a washer 44 encircle the bolt 42, and a nut 45 is then threaded on the end of the bolt 42. The channel member 36 is provided with a pair of bolts 46, the ends of which are provided with hook portions 47.

When it is desired to mount a spare tire on the chassis frame with this novel carrier, the member 19 is moved away from the chassis frame 10 and into the position shown in dotted lines in Figure 1. The channel 36 and the bar 37 of the support 18 are then moved together so as to permit their insertion into the rim 48 of a tire 49. The channel member 36 and the bar 37 are then moved back to their original position with respect to each other. Any suitable type of tire wrench is then engaged with the nut 32 and rotated so as to elevate the tire 49 a few inches off the ground. The member 19 is then swung under the frame into the position shown in full lines in Figure 1. When the tire is in this position, the wrench is applied to the nut 32 again, and the tire 49 elevated until the rim 48 sets itself in the recesses 16 provided in the brackets 15. It is also to be noted that, when the rim 48 and the tire 49 are in their elevated position, the bolts 46 in the channel member 36 should be near the openings 17 in the plates 15. The nuts on the end of the bolts 46 are then loosened so as to permit the hook portions 47 of these bolts to be inserted in the openings 17 of the brackets 15. The nuts on the bolts 46 are then tightened, which, through the support 18, urges the rim 48 into engagement with the recesses 16 in the plates 15 so as to securely hold the tire and rim in engagement with the chassis frame. When it is desired to remove the tire and rim from its mounting, the procedure just described need only be reversed. To disengage the ratchet 31, the lever 34 is moved, and the weight of the tire will drop the support to the ground.

From the foregoing description, it should be apparent that a novel tire and rim-carrying device has been provided for a motor vehicle. The device is simple and economical to manufacture and may be readily mounted on any truck chassis.

While only a preferred construction embodying the principles of the present invention has been described, it is to be understood that the invention is not to be limited to the specific details shown and described, but that, in fact, widely different means may be employed in the practice of the broader aspects of this invention.

What is claimed is:

1. A spare tire carrier for a vehicle having a frame, comprising a support pivotably mounted on the frame for swinging movement from a carrying position to an extended position with respect to the frame, a carrier member adapted to removably mount a spare tire and rim, means mounting the carrier for vertical movement with respect to the support from an upper position adjacent the support to a lower position in which the tire and rim may be mounted or dismounted on the carrier, further means carried by the support for moving the carrier between its upper and lower positions, said means including a winch on said support and swingable therewith, a cable extended between said carrier and said winch, and means for rotating said winch when the support is in either its extended or carrying position.

2. A spare tire carrier for a vehicle having a frame, comprising a support pivotably mounted on the frame for swinging movement from a carrying position to an extended position with respect to the frame, a carrier member adapted to removably mount a spare tire and rim, means mounting the carrier for vertical movement with respect to the support from an upper position adjacent the support to a lower position in which the tire and rim may be mounted or dismounted on the carrier, further means carried by the support for moving the carrier between its upper and lower positions, said means including a winch on said support and swingable therewith, a cable extended between said carrier and said winch, means for rotating said winch when the support is in either its extended or carrying position, and pawl and ratchet means affixed to said support and winch respectively whereby the carrier may be raised or lowered with respect to said support and may be locked in any desired position.

CHARLES W. GILDEA.
JOSEPH A. HAUSMANN.